Nov. 17, 1931.  A. WIRTH  1,832,602
SCALE WITH PENDULUM WEIGHT
Filed Oct. 11, 1928  2 Sheets-Sheet 1
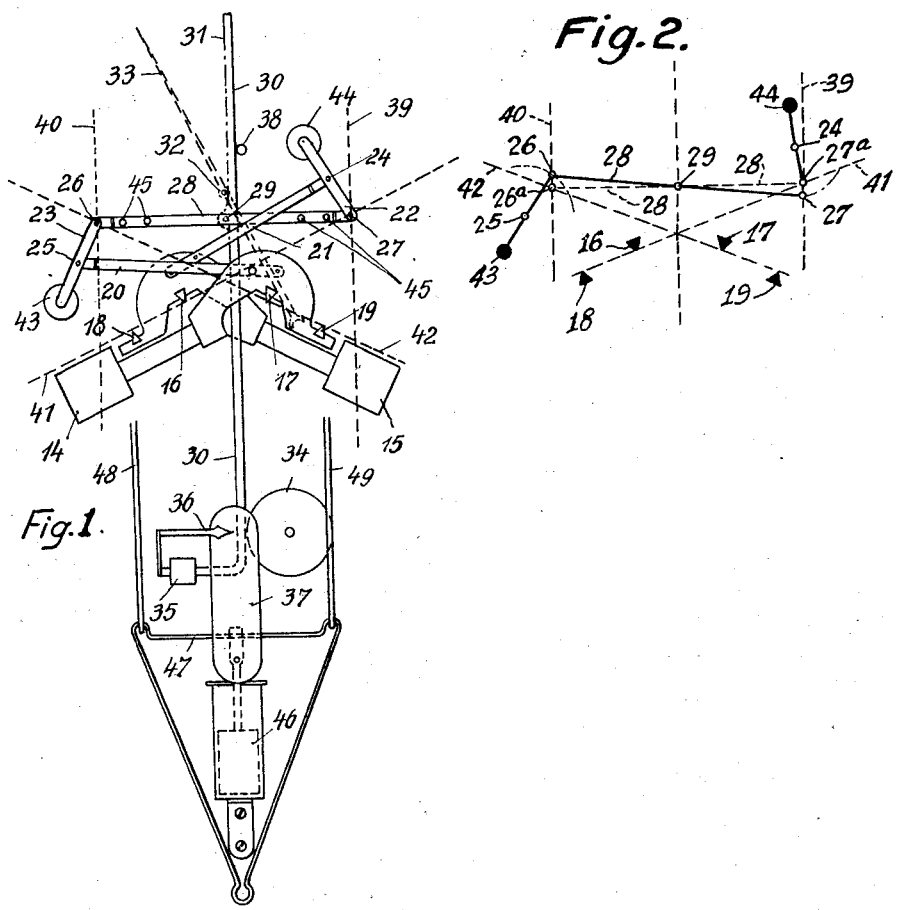
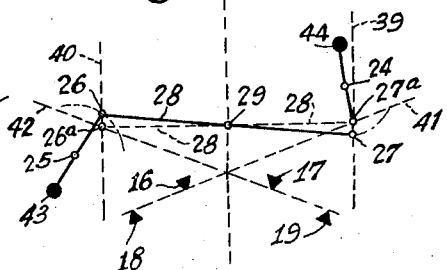
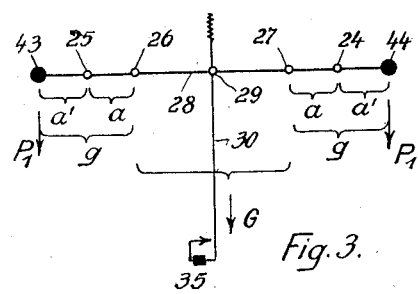
Inventor:
Armin Wirth,
by W. Schrenborn,
attorney.

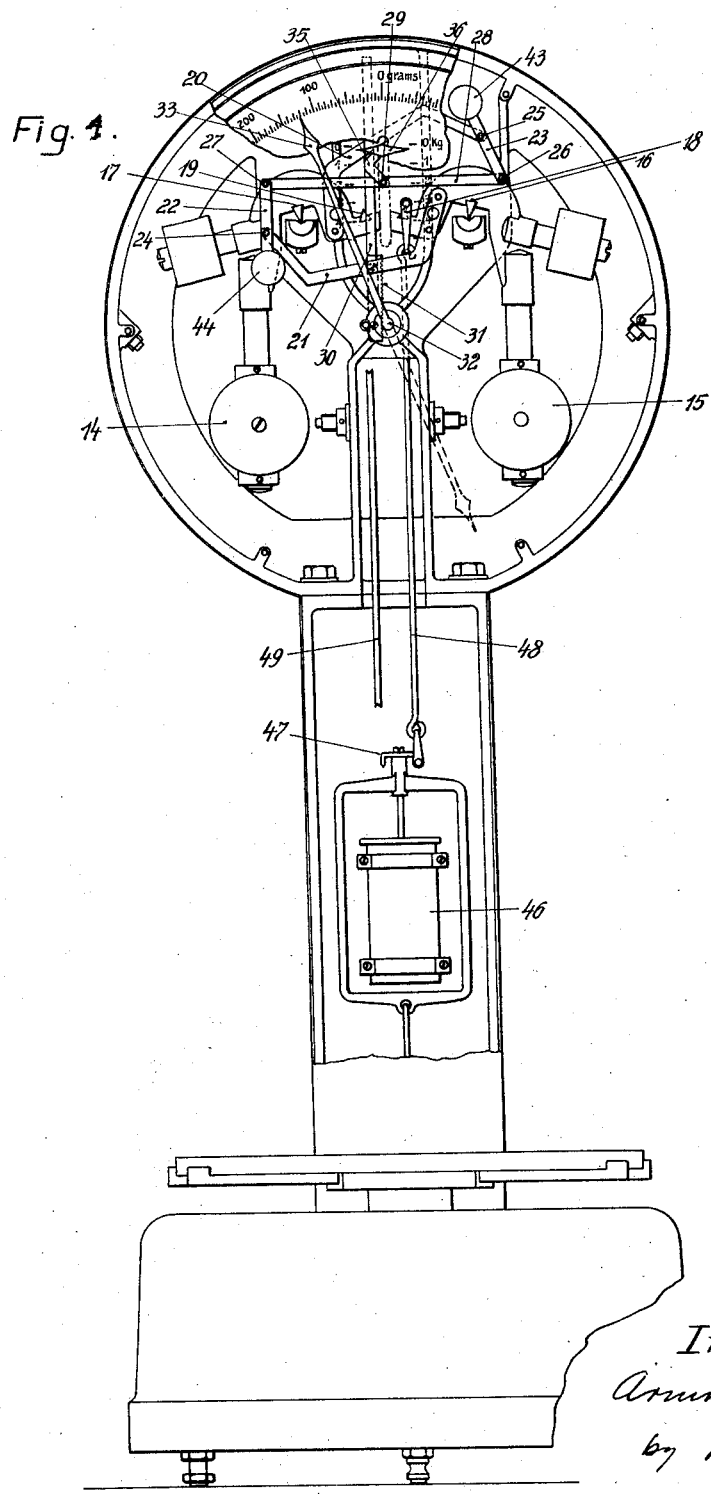

Patented Nov. 17, 1931

1,832,602

UNITED STATES PATENT OFFICE

ARMIN WIRTH, OF EBINGEN, WURTTEMBERG, GERMANY

SCALE WITH PENDULUM WEIGHT

Application filed October 11, 1928, Serial No. 311,861, and in Germany July 28, 1927.

In weighing machines of the tangent balance type the standard weight moves through unequal angles with respect to a uniformly increasing load. If the movement of the standard weight is transmitted to the pointer in an invariable ratio, the pointer will not move uniformly over the graduated scale. In order to obtain uniform reading of the scale in weighing machines of this type, either the movement of the standard weight has been rendered uniform by the insertion of an eccentric roller or of a cam disk or an eccentric roller or a cam disk has been inserted between the standard weight and the pointer and this roller or disk transmits the non-uniform movement of the standard weight to the pointer in such an irregular ratio that the latter makes a uniform movement. Tangent balance weighing machines are also known in which the non-uniform movement of the standard weight is so transmitted to the pointer by means of symmetrical guide rods that the movement of the pointer and, therefore, also, the reading of the scale become uniform. The points from which the pointer movement is derived are guided in such constructions for each tangential lever on the line connecting the two knife edges and on a vertical straight line. The guidance must be extremely accurate.

This invention relates to weighing machines of the tangent balance type with two symmetrically arranged tangential levers, which, due to the construction of the members transmitting the movement between the tangential levers and the pointer, always indicate the exact weight although the guidance is not absolutely accurate and moreover provide a simpler construction. According to the present invention, the movement of the pointer is derived from a point guided on a vertical straight line and taken on the rod connecting two points, each of which points is guided by one of the tangential levers by means of unsymmetrically arranged members in such a manner that the deviations from the lines connecting each of the corresponding knife edges are of equal dimensions and of opposite direction for both points. The movement of the pointer is taken, preferably, from the center of the connecting rod which is guided on the symmetry line of the tangential levers. Owing to this arrangement, the opposite and equal deviations of the two thus guided points cancel each other. The invention renders possible the employment of a very simple and lightly constructed set of levers by which friction is reduced to a minimum.

The invention consists of structural characteristics and relative arrangement of elements, which will be hereinafter more fully described and particularly pointed out in the appended claims.

Similar reference characters indicate the same parts in the several figures of the drawings, in which:

Figure 1 shows diagrammatically a construction of a weighing machine according to the present invention;

Figure 2 gives another position of the levers with deviations from the exact path;

Figure 3 is a diagram to explain part of Figure 1; and

Figure 4 gives a general view of the machine shown in Figure 1, with the casing open.

The tangential levers 14 and 15, Figure 1, are equally poised by knife edges 16 and 17 on bearings not shown in the drawings. The suspension rods 48, 49 coming from the scale or bridge of the machine are also partly omitted, they engage with the knife edges 18 and 19. The rods 20 and 21 are unsymmetrically arranged to each other, each secured by means of screws and pins to one of the levers 14 and 15, and two pins 24, 25 are carried on the free ends of these rods 20 and 21 at equal distances from each of the corresponding knife edges 16 and 17. The identical levers 22 or 23 are adapted to oscillate on these pins and their free ends are pivoted to the pins 26 or 27 secured to a connecting link 28, as shown.

The centers of rotation or pivots 24 and 25 of the levers form with the knife edges 16, 17, 18 and 19 two congruent triangles 16—18—24 and 17—19—25, and said triangles can be brought to coincide by moving them in the upright plane.

The levers 22 and 23 point in the same direction viewed from the triangle sides 18—24 and 19—25. The connecting link 28 carries in the center between the ends of the levers 22 and 23, that is to say, between the pins 26 and 27, a pin 29 on which is mounted the toothed rack 30, the teeth 31 of which mesh with a toothed pinion 32. The pointers 33, indicating the load, are secured to the spindle of the pinion 32.

The lower end of the rack 30 is lightly pressed by a weight 35 secured to its cranked end against the roller 34 and thereby the teeth 31 are kept in engagement with the pinion 32. One or more pointers 36 are connected to the lower end of the rack and indicate on a scale, provided at 37, the higher units of weight, for instance, kilograms, or the number of revolutions of the pinion 32 and, therefore, of the pointers 33. In order to ensure that the teeth 31 shall remain in mesh even in the event of a sudden movement, a pin or a roller 38 limits the travel of the rack 30 without, however, touching it as a rule. The rack 30 is guided by the pinion 32 and the rollers 34 and 38, so that the pin 29 is guided on the axis of symmetry of the tangential levers.

Due to this arrangement, the point 26 is guided on the one hand approximately on the knife edge straight line 42 connecting the bearing centers 17 and 19 of one tangential lever, and on the other hand on the vertical straight line 40, while the point 27 is guided on the one hand approximately on the knife edge straight line 41 passing through the two bearing centers 16 and 18 of the other tangential lever and on the vertical straight line 39.

If the distances of the centers of rotation of the levers 24—27 and 25—26 are equal, they form with the knife edges 16 and 17 two triangles 17—25—26 and 16—24—27, which can also be brought to coincide by movement in the vertical plane at any load. At any load, the triangle 17—25—26 has the same relative position to the knife edge straight line 42 as the triangle 16—24—27 has to the line 41. The deviations of the points 26 and 27 from the corresponding knife edge straight lines 42 and 41 are, therefore, equal and opposite and cancel each other at the point 29. This is shown in Figure 2 where the points 26, 27 do not agree with the points of intersection $26_a$, $27_a$ of the straight lines 40, 42 on the one hand and 39, 41 on the other hand. The center 29 is nevertheless situated at the correct height. The connecting link 28 is then in an inclined position, as shown in dotted line.

As the weight of all the loose parts of the system of levers acts in varying directions on the tangential weights and thus produces disturbing effects, balance weights 43 and 44, as diagrammatically indicated in Figure 3, may be mounted on the levers 22 and 23.

In Figure 3, G is the weight of the central parts, $P_1$ are the balance weights at the ends of the levers 22 and 23 and $g$ is the weight of each of these levers with the partial lengths $a$ and $a'$ shown in Figure 3. If these partial lengths are made of equal size, and $P_1$ is made equal to half of G, there will be neutral equilibrium relatively to the rotations about 24 and 25 when the whole of the rods are supported at 24 and 25.

If the rods are placed on pendulums, they will then exert a purely gravity action. Each of the pins to be mounted at 24 and 25 will then be loaded with $\frac{1}{2}G + P_1 + g = G + g$, where $g$ is the weight of the lever 24 or 25. If, therefore, during the adjustment of each of the pendulums before erection, this weight is suspended on the pins mounted at 24 and 25, all the faults will be eliminated. Obviously, one is not bound to the ratio of $a : a' = 1$, taken merely by way of example, on the contrary, it may be given any desired value.

The four screws 45, in Figure 1, indicate that the partial lengths 26—29 and 29—27 of the connecting link 28 can be made adjustable. This longitudinal adjustability is intended for exact adjustment after the preliminary adjustment.

In the case of sensitive weighing machines, knife edges and point bearings may be used instead of pins at the centers of rotation.

Moreover, a damping device 46 may be mounted on the intermediate suspension rods 47 or on the beam of the machine.

What I claim is:

1. An automatic weighing machine of the tangent balance type, comprising two symmetrically arranged tangent levers, a load tray, means for connecting said load tray to said symmetrically arranged tangent levers, an indicating hand, a connecting rod attached to said indicating hand, a counterweight lever pivoted at each end of said connecting rod and arranged in opposite directions from each other, and two unsymmetrically arranged links, each one of which links has one of its ends connected to one of the counterweighted levers, and its other end to one of the tangent levers, whereby the deviations of the connections of the counterweighted levers with the connecting rod are substantially equal and in an opposite direction.

2. An automatic weighing machine of the type as indicated in claim 1, in which the unsymmetrically arranged links are pivoted to said counterweight levers at points which form with the pivoted points of said tangential levers a triangle which is capable of coinciding with the corresponding triangle of the other tangential lever.

3. An automatic weighing machine of the type as indicated in claim 1, in which the counterweighted levers are of such proportion and arrangement as to balance the movements produced by the dead weights of the mechanism.

4. An automatic weighing machine of the type indicated in claim 1, in which the connecting rod is divided and made adjustable in length.

5. An automatic weighing machine of the tangent balance type, comprising two symmetrically arranged tangent levers, a load tray, means for connecting said load tray to said symmetrically arranged tangent levers, an indicating hand, a connecting rod attached to said indicating hand, an auxiliary lever pivoted at each end of said connecting rod and arranged in opposite directions from each other, and two unsymmetrically arranged links, each one of which links has one of its ends connected to one of the auxiliary levers, and its other end to one of the tangent levers, whereby the deviations of the connections of the auxiliary levers with the connecting rod are substantially equal and in an opposite direction.

In testimony whereof I have affixed my signature.

ARMIN WIRTH.